United States Patent [19]

Flygstad

[11] 3,874,614

[45] Apr. 1, 1975

[54] TAPE DRIVE

[75] Inventor: Dean W. Flygstad, St. Paul, Minn.

[73] Assignee: Telex Communications, Inc., Minneapolis, Minn.

[22] Filed: June 11, 1973

[21] Appl. No.: 368,649

[52] U.S. Cl. .................................. 242/209, 242/200
[51] Int. Cl. .............................................. G03b 1/04
[58] Field of Search ............................ 242/201-209, 242/67.4; 274/4 D, 11 D; 179/100.2 R; 360/73-74

[56] References Cited

UNITED STATES PATENTS

| | | | |
|---|---|---|---|
| 2,668,059 | 2/1954 | Roberts | 274/4 D |
| 2,705,262 | 3/1955 | Post et al. | 179/100.2 R |
| 2,858,996 | 11/1958 | Switzer | 242/202 |
| 3,109,603 | 11/1963 | Berlant | 242/202 |
| 3,741,499 | 6/1973 | Osborn | 242/201 |

*Primary Examiner*—Leonard D. Christian
*Attorney, Agent, or Firm*—Warren A. Sturm

[57] ABSTRACT

A tape drive system for a cassette device having a capstan shaft, a take-up spindle and a pay out spindle in which a single motor is adjustably disposed to selectively drive the capstan shaft through a resilient belt and the tape-up spindle through a pressure responsive clutch and a non-extensible belt; to drive the pay out spindle in a reverse direction through a puck on the motor shaft; or to drive the take-up spindle through the non-extensible belt at an increased lateral pressure for increased torque through the pressure responsive clutch.

10 Claims, 7 Drawing Figures

TAPE DRIVE

BACKGROUND OF THE INVENTION

This invention relates to an improved simplified drive mechanism for a tape cassette handling apparatus.

SUMMARY OF THE INVENTION

The drive system of this invention utilizes a motor shaft which includes a puck and two belts to provide play-fast forward and rewind modes of operation, through the use of a simple lever to swing the motor about a pivot or to reposition on a slide or the like. One of the belts is fabricated of non-extensible material while the other belt is fabricated of extensible resilient material. The non-extensible belt is utilized in combination with a pressure responsive pulley to provide the desired operational characteristics. In one embodiment, a capstan was driven with a belt comprised of extensible resilient material, the take-up spindle was driven with the belt comprised of non-extensible material and included a pulley which increased torque transmission as the side thrust was increased and the pay out spindle was driven directly from the puck on the motor shaft.

DESCRIPTION OF THE DRAWINGS

As will become apparent from a consideration of the appended specification, claims and drawings, my invention provides the functions required in a simple straightforward and reliable manner and referring particularly to the accompanying drawings;

DESCRIPTION OF THE PREFERRED EMBODIMENT

Figure 1:
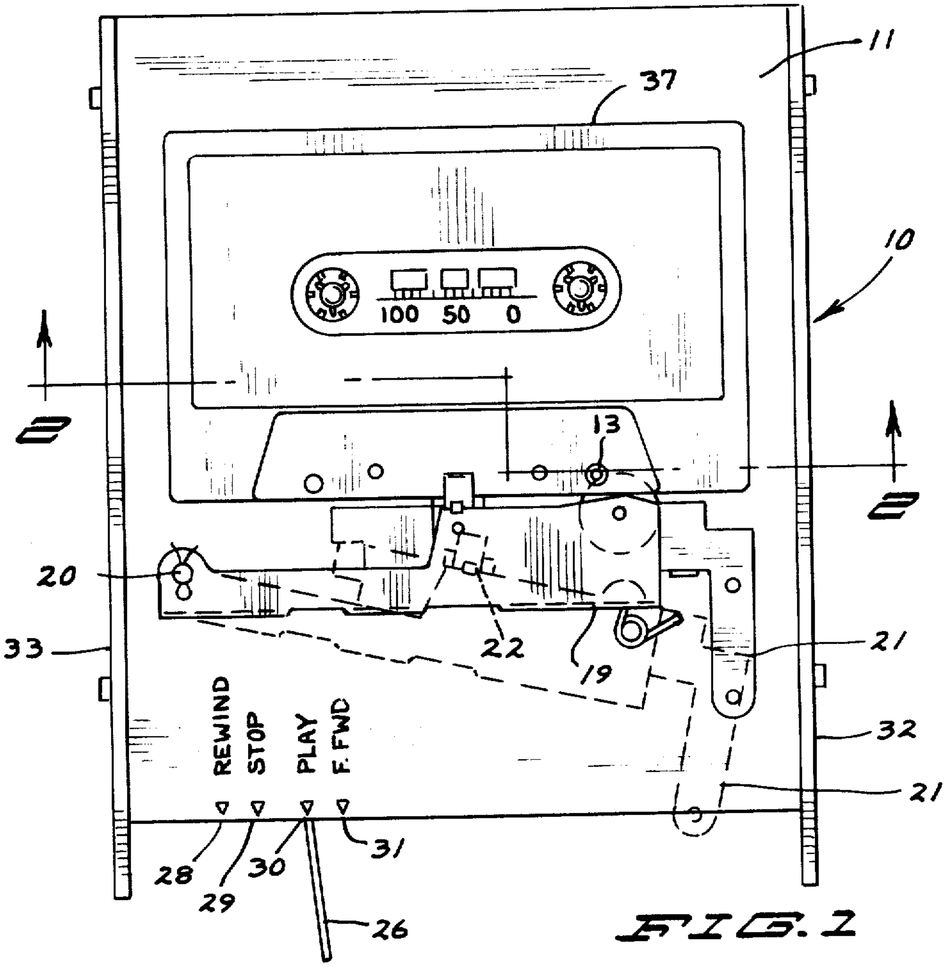
FIG. 1 is a top plan view of a tape cassette playing device incorporating the principles of my invention.
Figure 2:
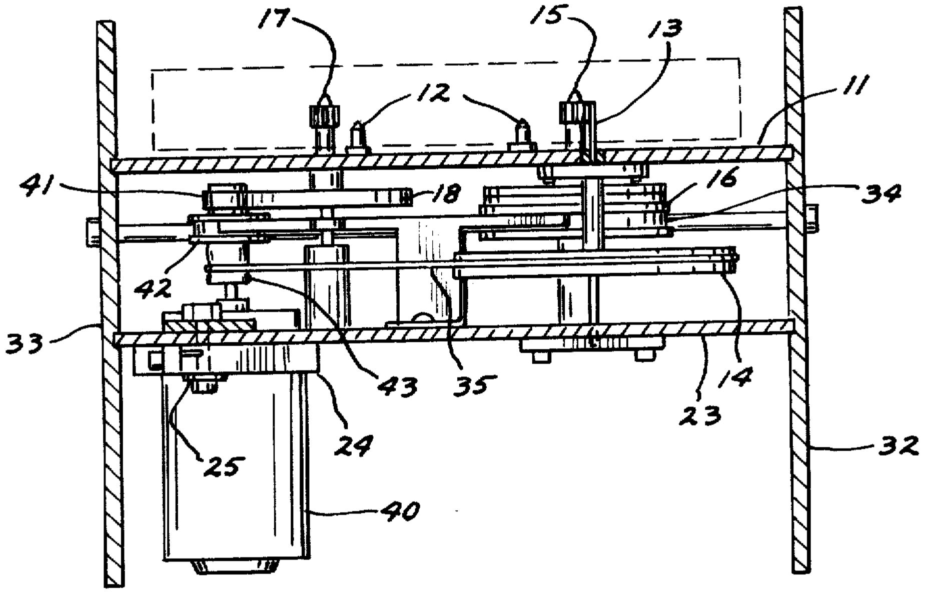
FIG. 2 is a sectional view of the apparatus of FIG. 1 taken along section line 2—2.
Figure 3:
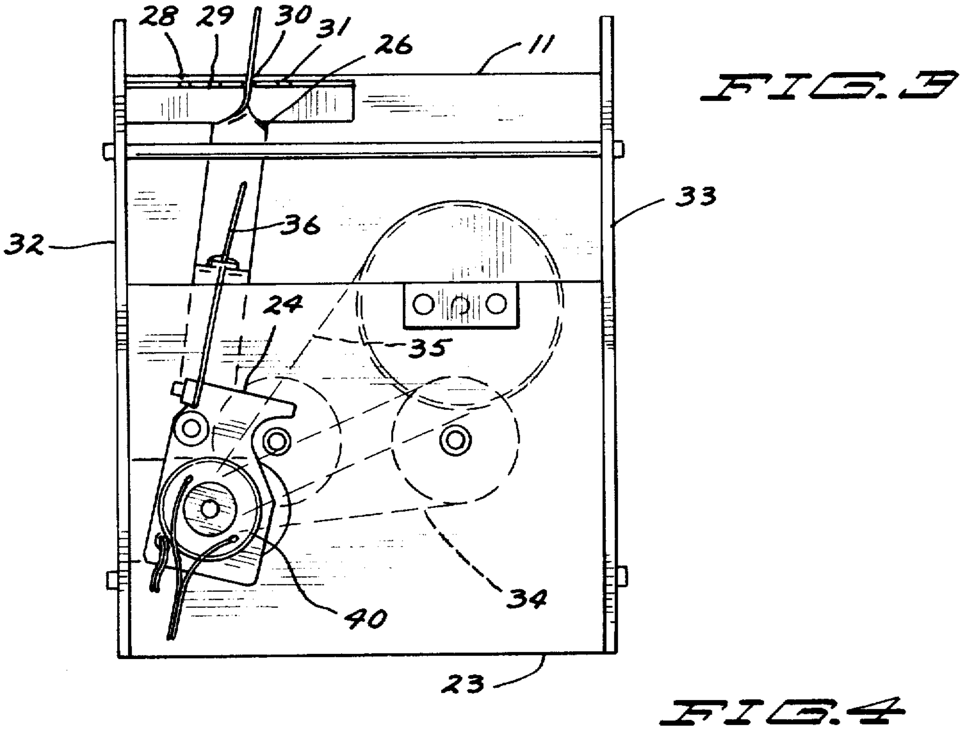
FIG. 3 is a bottom view of the tape player of FIG. 1 shown on a reduced scale.

In the drawings, there is shown a tape cassette player indicated generally by reference character 10 having a top chassis 11 which includes a plurality of locating studs 12 onto which a tape cassette cartridge is disposed so as to be maintained in predetermined relationship with a canstan 13. A drive pulley for capstan 13 is disposed on the lower end thereof and indicated by reference character 14.

A take-up spindle 15 is shown having a drive pulley 16 disposed on the lower end thereof and a pay out spindle 17 is shown having a drive pulley 18 disposed at the bottom portion thereof. A mounting for a magnetic head is indicated by reference character 19 and is shown rotatably disposed on a pivot 20 and includes a drive lever arm 21 and a tape head 22 disposed in predetermined location to establish magnetic energy transferring contact with the tape in a cassette when disposed on the locating studs 12 on top chassis 11. Bottom chassis 23 includes a motor mount 24 that is pivoted about bolt 25. A control lever arm 26 is likewise pivoted about bolt 25 and is connected to motor mount 24 through an actuator 36. A plurality of detents are disposed adjacent the forward end of lever 26 and are indicated as rewind detent 28, stop detent 29, play detent 30, and fast forward detent 31.

Cassetts player 10 also includes right and left side members held together by suitable fastening means. A cassette cartridge 37 is shown disposed in playing position on the top of chassis 11 in FIG. 1 of the drawings.

A motor 40 is disposed on motor mount 24 and is provided with a puck 41, a take-up pulley 42, and a capstan pulley 43. A capstan belt is indicated by reference character 35 and a take-up belt is indicated by reference character 34.

Figures 5, 6, 7:
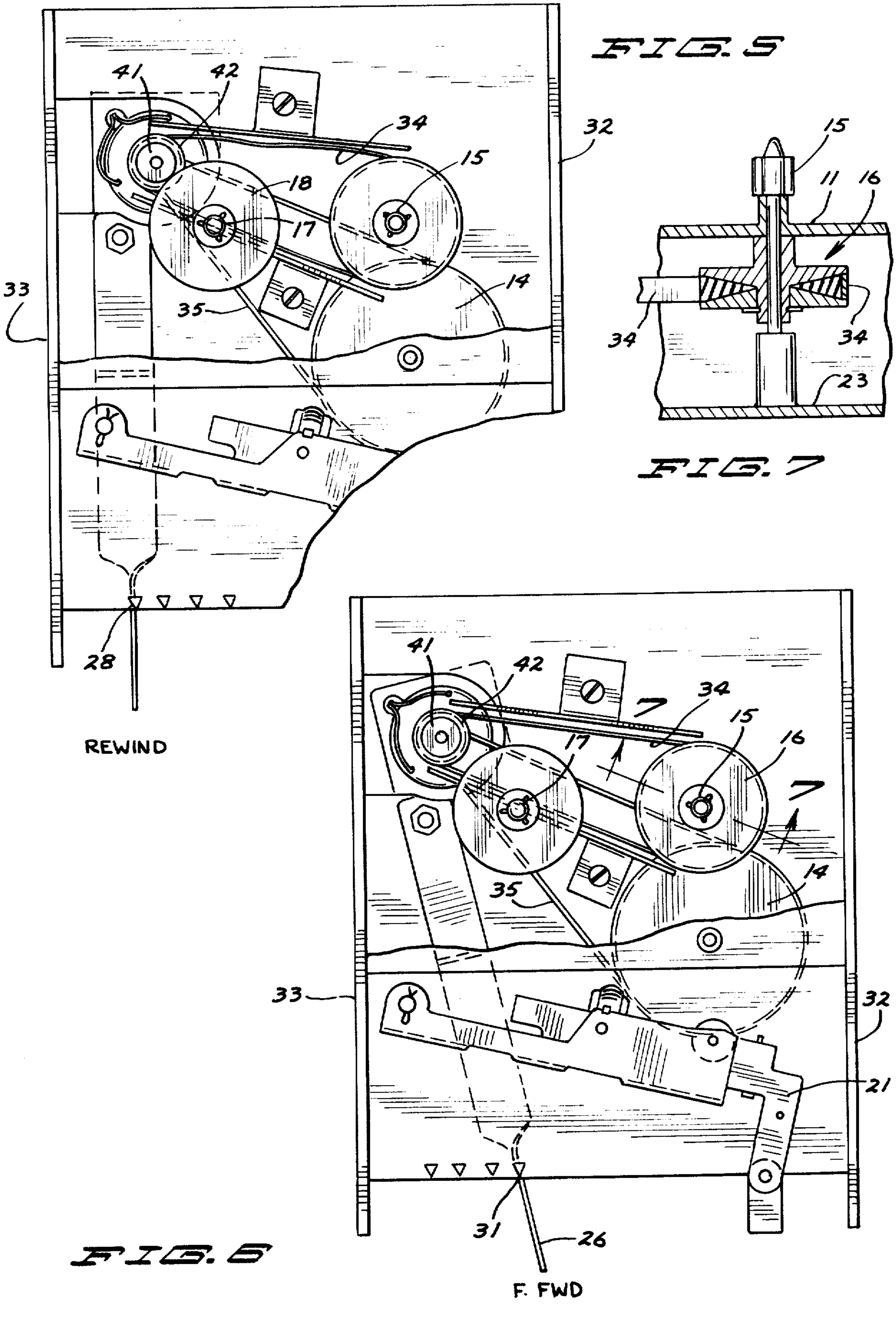
FIG. 5 is a fragmentary top view like that of FIG. 4 showing the relationship of the elements when the tape player is in a rewind mode of operation.
FIG. 6 is similarly a top view of the apparatus showing the parts in their disposition when in a fast forward mode of operation for driving a tape cassette.
FIG. 7 is an enlarged fragmentary sectional view taken along section line 7—7 on FIG. 6 of the drawings.

Take-up spindle pulley 16 is shown in enlarged detail in FIG. 7 and is shown to be comprised of a standard form of pressure responsive clutch which may be fabricated of many different forms of elements to perform the desired function. Generally, the device illustrated in FIG. 7 is shown provided with a pair of cone-shaped pulley members with the upper member comprising an output end and the lower member slidably disposed on the upper member in abutting relationship with a stop. A washer-like member comprised of resilient material such as felt or rubber is disposed between the two cone-shaped members and is responsive to side thrust imposed thereon by inextensible driving belt 34 to drive take-up spindle 15 under such conditions of operation as a tension is imposed on belt 34.

Take-up belt 34 may be comprised of suitable non-extensible material, such as mylar or the like, while capstan belt 35 is preferably comprised of flexible material such as rubber or the like.

Puck 41 on motor 40 is preferably comprised of metal and pulley 18 on pay out spindle 17 is comprised of relatively soft resilient material such as rubber.

The mechanism for suitably positioning the pressure roller and tape head disposed on head mounting 19 has not been illustrated and does not form a part of the present invention. Those skilled in the art with which this invention pertains may appreciate that head mounting 19 may be driven directly from lever 26 through appropriate mechanical linkages or may be driven by solenoids or the like under the control of an electrical circuit.

OPERATION

Figure 4:
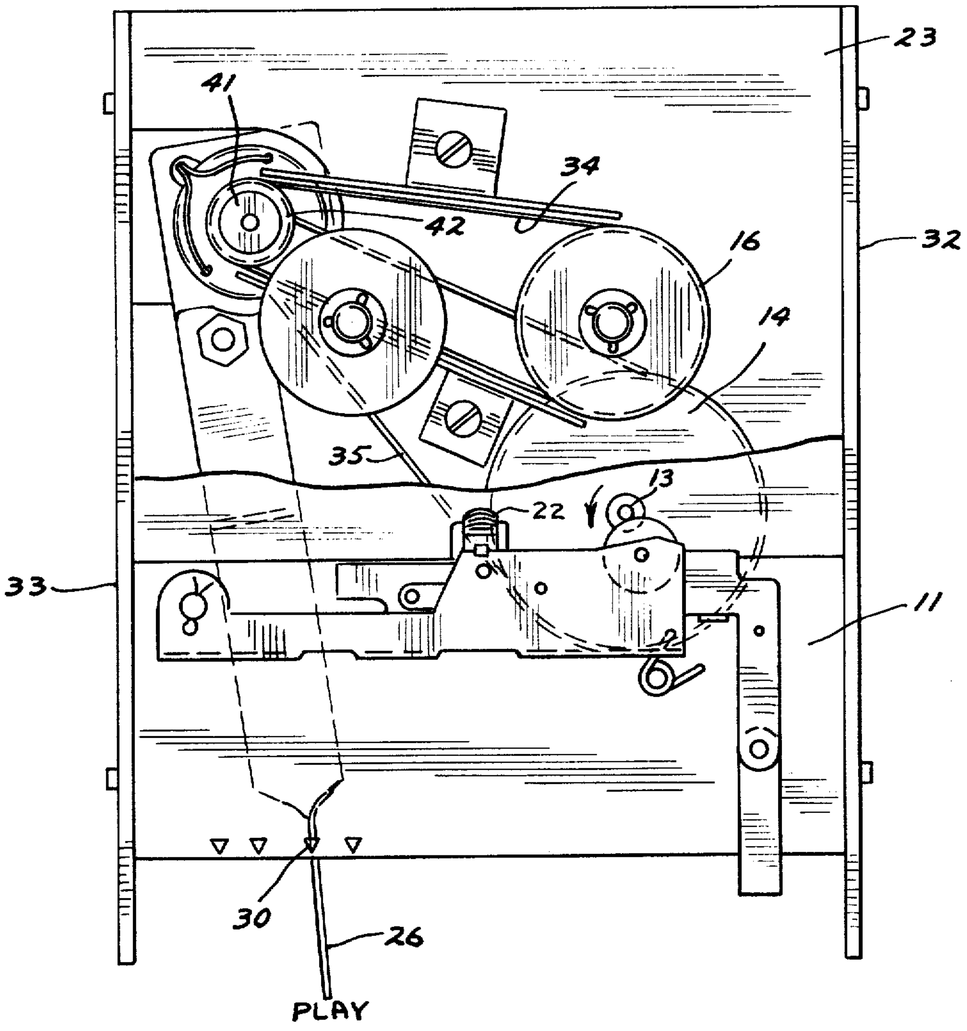
FIG. 4 is a top view with a portion of the chassis of the tape player of FIG. 1 removed to indicate the working relationship between the several elements when in a tape playing position.

Referring to FIG. 4 of the drawings, the device is shown in operation in the play mode wherein puck 41 is not in engagement with pulley 18, capstan 13 is driven through belt 35 and take-up spindle 15 is driven through belt 34. As may be seen from the relationship of elements in, for example, FIG. 6 of the drawings in the fast forward mode of operation, the side thrust imposed on pulley 16 on spindle 15 is less than is attained in the fast forward direction of operation. There is some torque transmitted through the clutching arrangement of pulley 16, but not enough to disturb the driving relationship between capstan 13 and its associated pressure roller in driving the tape.

When the device is in the position of FIG. 5, the lever 26 is placed at position 28 for the rewind mode of operation in which puck 41 on motor 40 is in driving engagement with pulley 18 on pay-out spindle 17, belt 35 is still operative to drive capstan 13, but since the head mounting is withdrawn, there is no driving engagement of capstan 13 with the tape in the cassette cartridge, and belt 34 is loosely disposed intermediate pulley 42 and 16.

In the fast forward mode of operation of FIG. 6 of the drawings, belt 34 is tightened as much as possible to exert a considerable side thrust on pulley 16 and head mounting lever 19 is again retracted so that all of the torque and speed supplied by drive pulley 42 on motor 40 is transmitted to take-up spindle 16 to effect a fast forward operation.

In either of the fast foward or rewind modes of operation the speed of operation of motor 40 may be increased by suitable means (not shown) to improve the overall operational efficiency of the apparatus. For example, an electric switch could be actuated by lever 26 to bypass the normal energization circuits for motor 40 to provide the increased speed.

Having now therefore fully illustrated and described my invention, what I claim to be new and desire to protect by Letters Patent is:

1. In apparatus of the class above described, the combination comprising;

a base;

a capstan rotatably journaled on said base;

a take-up spindle rotatably journaled on said base;

a motor having a shaft and a pair of drive pulleys thereon;

mounting means for adjustably mounting said motor on said base, the axes of said motor, capstan and said take-up spindle being in parallelism;

a resilient drive belt intermediate one of the pulleys on said motor and said capstan;

a pressure responsive pulley on said take-up spindle; and a non-extendible drive belt intermediate the other pulley on said motor and the pressure responsive pulley on said take-up spindle.

2. The subject matter of claim 1 in which the motor shaft includes further drive means operable to drivably engage a pay out spindle.

3. The subject matter of claim 1 in which the mounting means for the motor is disposed on a lever having an axis of rotation that is parallel to the motor shaft take-up spindle, and capstan axes.

4. The subject matter of claim 3 in which the lever is operable to selectively drive the capstan or the spindle.

5. The subject matter of claim 2 in which the mounting means for the motor is disposed on a lever having an axis of rotation that is parallel to the motor shaft take-up spindle, and capstan axes.

6. The subject matter of claim 3 in which the lever means includes resilient driving means connected to the mounting means for the motor.

7. The apparatus of claim 1 in which means responsive to the position of the mounting means for the motor are provided to maintain a tape head and a pressure roller for the capstan in contact with a tape to be transported when the mounting is in a play position.

8. the apparatus of claim 2 in which means responsive to the position of the mounting means for the motor are provided to maintain a tape head and a pressure roller for the capstan in contact with a tape to be transported when the mounting is in a play position.

9. The apparatus of claim 3 in which means responsive to the position of the mounting means for the motor are provided to maintain a tape head and a pressure roller for the capstan in contact with a tape to be transported when the mounting is in a play position.

10. The apparatus of claim 4 in which means responsive to the position of the mounting means for the motor are provided to maintain a tape head and a pressure roller for the capstan in contact with a tape to be transported when the mounting is in a play position.

* * * * *